US 9,507,641 B1

(12) United States Patent
Artmeier et al.

(10) Patent No.: US 9,507,641 B1
(45) Date of Patent: Nov. 29, 2016

(54) SYSTEM AND METHOD FOR DYNAMIC GRANULARITY CONTROL OF PARALLELIZED WORK IN A PORTABLE COMPUTING DEVICE (PCD)

(71) Applicant: QUALCOMM INCORPORATED, San Diego, CA (US)

(72) Inventors: James Michael Artmeier, Boulder, CO (US); Sumit Sur, Boulder, CO (US); Robert Scott Dreyer, Menlo Park, CA (US); Michael Douglas Sharp, Los Gatos, CA (US); James Lyall Esliger, Richmond Hill (CA)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/709,385

(22) Filed: May 11, 2015

(51) Int. Cl.
*G06F 9/46* (2006.01)
*G06F 9/50* (2006.01)

(52) U.S. Cl.
CPC ............ *G06F 9/5044* (2013.01); *G06F 9/505* (2013.01); *G06F 9/5083* (2013.01)

(58) Field of Classification Search
None
See application file for complete search history.

(56) References Cited

U.S. PATENT DOCUMENTS

| | | | | |
|---|---|---|---|---|
| 8,707,320 B2* | 4/2014 | Liddell | ................... | G06F 9/505 718/104 |
| 8,719,803 B2 | 5/2014 | Toub et al. | | |
| 8,843,932 B2 | 9/2014 | Sohi et al. | | |
| 2013/0132972 A1* | 5/2013 | Sur | ......................... | G06F 1/206 718/105 |
| 2013/0298130 A1 | 11/2013 | Pienaar et al. | | |
| 2014/0259024 A1 | 9/2014 | Sridharan et al. | | |
| 2014/0380322 A1* | 12/2014 | Ailamaki | .............. | G06F 9/4843 718/102 |

FOREIGN PATENT DOCUMENTS

EP     2819009 A2     12/2014

OTHER PUBLICATIONS

Certner O., et al., "A Practical Approach for Reconciling High and Predictable Performance in Non-Regular Parallel Programs", 2008 Design, Automation and Test in Europe, Date'08, Mar. 10-14, 2008, Piscataway, NJ: IEEE Service Center, US, XP031241880, Mar. 10, 2008 (Mar. 10, 2008), pp. 740-745, ISBN: 978-3-9810801-3-1.
International Search Report and Written Opinion—PCT/US2016/027656—ISA/EPO—Jun. 14, 2016.
Palatin P., et al., "Capsule: Hardware-Assisted Parallel Execution of Component-Based Programs", Micro Architecture, 2006, Micro-39, 39th Annual IEEE/ACM International Symposium on, IEEE, PI, Dec. 1, 2006 (Dec. 1, 2006), pp. 247-258, XP031034175, ISBN: 978-0-7695-2732-1 the whole document.

* cited by examiner

*Primary Examiner* — Sisley Kim
(74) *Attorney, Agent, or Firm* — Smith Tempel

(57) ABSTRACT

Systems and methods for dynamic granularity control of parallelized work in a heterogeneous multi-processor portable computing device (PCD) are provided. During operation a first parallelized portion of an application executing on the PCD is identified. The first parallelized portion comprising a plurality of threads for parallel execution on the PCD. Performance information is obtained about a plurality of processors of the PCD, each of the plurality of processors corresponding to one of the plurality of threads. A number M of workload partition granularities for the plurality of threads is determined, and a total execution cost for each of the M workload partition granularities is determined. An optimal granularity comprising a one of the M workload partition granularities with a lowest total execution cost is determined, and the first parallelized portion is partitioned into a plurality of workloads having the optimal granularity.

26 Claims, 6 Drawing Sheets

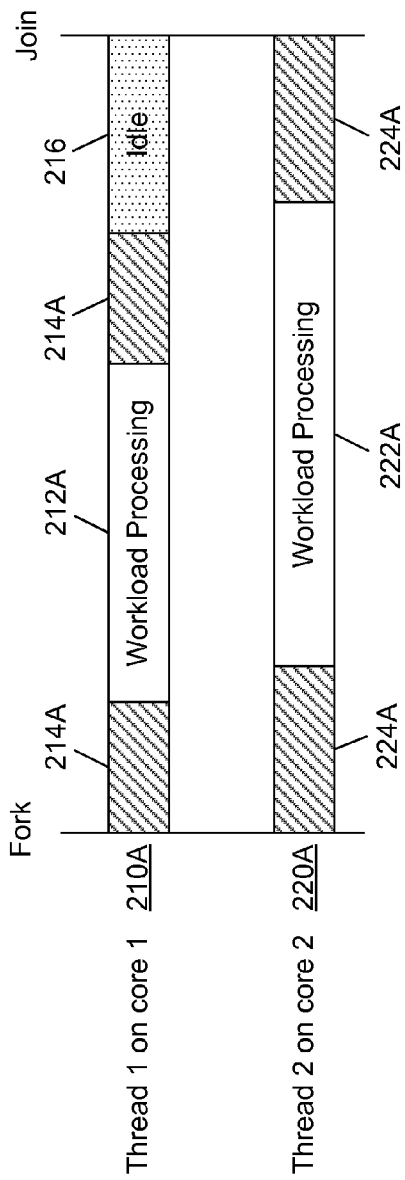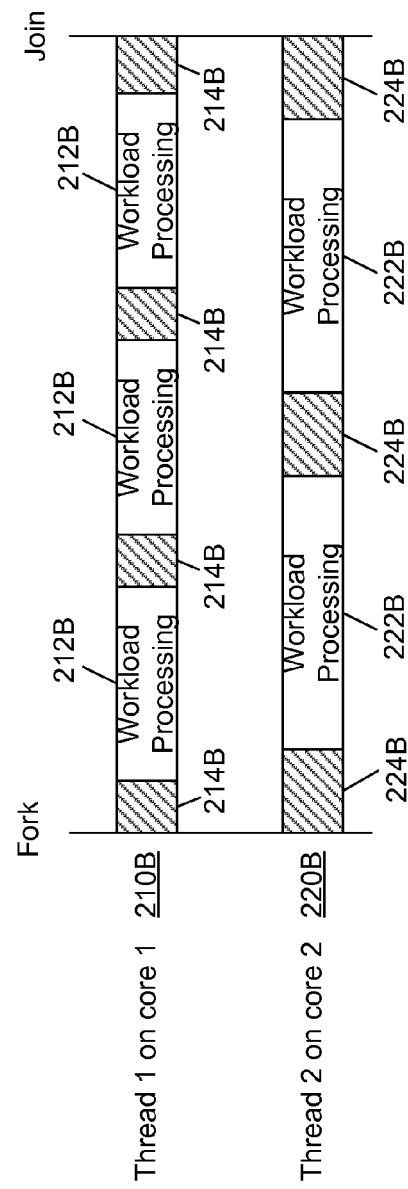

SYSTEM AND METHOD FOR DYNAMIC GRANULARITY CONTROL OF PARALLELIZED WORK IN A PORTABLE COMPUTING DEVICE (PCD)

DESCRIPTION OF THE RELATED ART

Devices with a processor that communicate with other devices through wireless signals, including portable computing devices (PCDs), are ubiquitous. These devices may include mobile cellular telephones, portable digital assistants (PDAs), portable game consoles, tablet computers, and other portable electronic devices. In addition to the primary function of these devices, many include peripheral functions. For example, a mobile or cellular telephone may include the primary function of enabling and supporting telephone calls and the peripheral functions of a camera, video camera, global positioning system (GPS) navigation, web browsing, viewing videos, playing games, sending and receiving emails, sending and receiving text messages, etc.

As the functionality of such devices increases there exists a need for greater computing power. Accordingly, modern PCDs typically include multiple processors or cores (e.g., central processing unit(s) (CPUs), video decoder, graphics processing unit(s) (GPU), modem processor, digital signal processor(s) (DSPs), etc.) for controlling or performing varying functions of the PCD. To take advantage of the increased number of processors/cores, applications and software executed by the PCD may be multi-threaded, allowing execution of portions of one or more application in parallel.

However, the performance of applications executed in parallel may suffer given the presence of an increasing number of cores and/or CPUs of differing capabilities and frequencies, as well as the desire to dynamically throttle one or more cores or CPUs due to ever changing thermal or power saving states, and the increased number of applications designed to be multi-threaded.

Thus, there is a need for improved systems and methods to dynamically control the granularity of the work being executed in parallel in a PCD.

SUMMARY OF THE DISCLOSURE

Systems and methods for dynamic granularity control of parallelized work in a heterogeneous multi-processor portable computing device (PCD) are provided. During operation a first parallelized portion of an application executing on the PCD is identified. The first parallelized portion comprising a plurality of threads for parallel execution on the PCD. Performance information is obtained about a plurality of processors of the PCD, each of the plurality of processors corresponding to one of the plurality of threads. A number M of workload partition granularities for the plurality of threads is determined, and a total execution cost for each of the M workload partition granularities is determined. An optimal granularity comprising a one of the M workload partition granularities with a lowest total execution cost is determined, and the first parallelized portion is partitioned into a plurality of workloads having the optimal granularity.

One example embodiment is a PCD including a central processing unit (CPU) containing a plurality of heterogeneous processors; and a memory in communication with the CPU, the memory storing: at least one application being executed by the CPU, and logic configured to: identify a first parallelized portion of the application, the first parallelized portion comprising a plurality of threads for parallel processing by the CPU, obtain performance information about a first set of the plurality of processors of the PCD, each of first set of the plurality of processors corresponding to one of the plurality of threads, determine a number M of workload partition granularities for the plurality of threads, determine a total execution cost for each of the M workload partition granularities, determine an optimal granularity comprising a one of the M workload partition granularities with a lowest total execution cost, and partition the first parallelized portion of the application into a plurality of workloads having the optimal granularity Additional embodiments of the systems and methods for dynamic granularity control of parallelized work in a heterogeneous multi-processor PCD are also provided.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 2A is a graph illustrating an exemplary execution of a parallelized workload by processors that may be implemented in the PCD embodiment illustrated in FIG. 1;

FIG. 2B is a graph illustrating an exemplary execution of a parallelized workload with an optimized granularity for work portions executed by processors that may be implemented in the PCD embodiment illustrated in FIG. 1;

DETAILED DESCRIPTION

Figure 1:
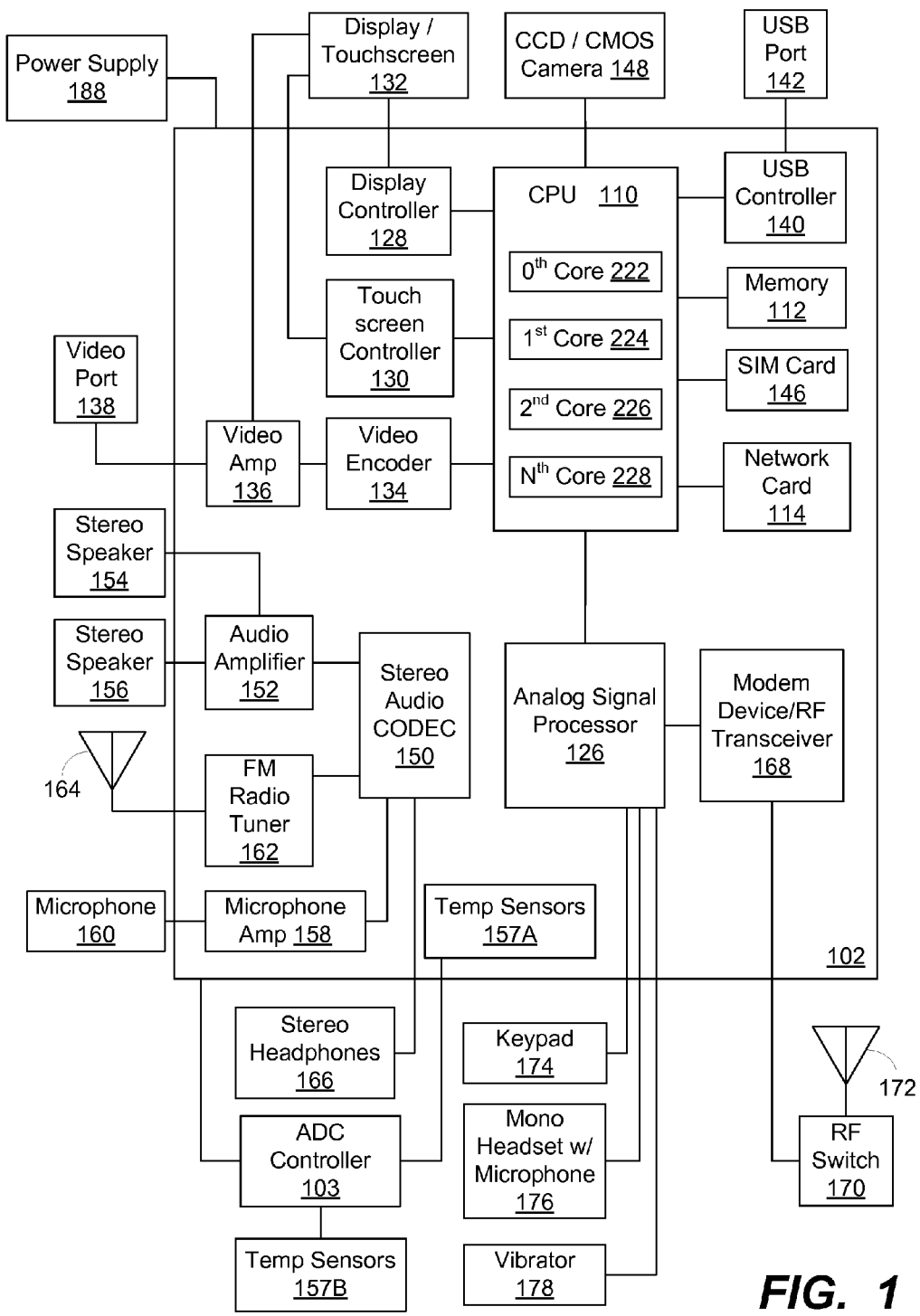
FIG. 1 is a block diagram of an example embodiment of a portable computing device (PCD) in which the present invention may be implemented.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files or data values that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the term "portable computing device" ("PCD") is used to describe any device operating on a limited capacity rechargeable power source, such as a battery and/or capacitor. Although PCDs with rechargeable power sources have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop or tablet computer with a wireless connection, among others.

In this description, the terms "central processing unit ("CPU")," "digital signal processor ("DSP")," "graphics processing unit ("GPU")," "chip," "video codec," "system bus," "image processor," and "media display processor ("MDP")" are non-limiting examples of processing components that may benefit from the present systems and methods. These terms for processing components are used interchangeably except when otherwise indicated. Moreover, as discussed below, any of the above or their equivalents may be implemented in, or comprised of, one or more distinct processing components generally referred to herein as "core(s)" and/or "sub-core(s)."

In this description, the terms "workload," "process load," "process workload," and "graphical workload" are used interchangeably and generally directed toward the processing burden, or percentage of processing burden, that is associated with, or may be assigned to, a given processing component in a given embodiment. Additionally, the related terms "frame," "code block" and "block of code" are used interchangeably to refer to a portion or segment of a given workload. For instance, a graphical workload may be comprised of a series of frames, as would be understood by one of ordinary skill in the art of video processing. Further to that which is defined above, a "processing component" or the like may be, but is not limited to being, a central processing unit, a graphical processing unit, a core, a main core, a sub-core, a processing area, a hardware engine, etc. or any component residing within, or external to, an integrated circuit within a portable computing device.

One of ordinary skill in the art will recognize that the term "MIPS" represents the number of millions of instructions per second a processor is able to process at a given power frequency. In this description, the term is used as a general unit of measure to indicate relative levels of processor performance in the exemplary embodiments and will not be construed to suggest that any given embodiment falling within the scope of this disclosure must, or must not, include a processor having any specific Dhrystone rating or processing capacity. Additionally, as would be understood by one of ordinary skill in the art, a processor's MIPS setting directly correlates with the power, frequency, or operating frequency, being supplied to the processor.

The present systems and methods for dynamic granularity control of a parallelized portion of an application in a PCD provide a cost effective ability to dynamically and/or adaptively minimize the total processing cost and overhead cost incurred by the threads/cores/CPUs executing the parallelized portions of the application. This ability is particularly beneficial in a PCD environment since PCD's typically implement heterogeneous multi-core/multi-CPU systems and PCDs typically rely on throttling and power savings modes to control thermal conditions and power consumption than do other computing environments, such as desktop computers, where other cooling mechanisms such as cooling fans are available and where battery life is not as critical.

In an embodiment, the portions of work performed by an application that have been parallelized are not evenly divided among the number of threads, cores or CPUs available to process the parallelized application code. Instead, the threads of the parallelized portion of the application are broken into work partitions based on one or more of static conditions of the system, dynamic conditions of the system, and/or the type of workload in order to minimize processor idle wait times and delays from thread latency and synchronization overhead.

In embodiments of the systems and methods, an optimal granularity or size for the work partitions is determined or estimated that results in the lowest total cost to the system, which cost may also include processing times for the cores/CPUs designated or available to execute the work partitions of the parallelized portion of the application. Embodiments of the present systems and methods dynamically and/or adaptively allow faster cores/CPUs execute more of the parallelized code (minimizing processor idle wait times) while also minimizing the delays from the overhead incurred in parallel processing of the code, such as fork-join operations, signaling, etc. Thus, the present systems and methods allow for improved management or control of the execution of the parallel threads on a heterogeneous multi-core/multi-processor PCD.

One example embodiment is a PCD including a CPU with two or more cores/processors in communication with at least one memory. Stored in at least one memory is an operating system for operating and/or controlling the cores/processors, one or more applications that are being executed by the PCD, such as by sending tasks or work for execution by one or more of the cores/processors. Also stored in the memory in the exemplary embodiment is a parallelized work manager or module in communication with the application(s) and the operating system. The exemplary parallelized work manager includes one or more queues for holding parallelized tasks to be executed independently and/or in parallel by one or more threads/cores. The exemplary parallelized work manager also includes granularity logic that operates to determine the optimal granularity or size for work partitions of the parallelized tasks during the runtime, depending on the system and the current conditions of the system.

Although described with particular reference to an operation within a PCD, the described systems and methods for dynamic granularity control of parallelized work are applicable to any system with a processor, or processing subsystem where it is desirable to conserve power consumption, enhance performance, or improve quality of service. Stated another way, the described systems and methods may be implemented to provide dynamic granularity control of parallelized work in a system other than a portable device.

The system and methods for dynamic granularity control of parallelized work described herein, or portions of the system and methods, may be implemented in hardware or software. If implemented in hardware, the devices can include any, or a combination of, the following technologies, which are all well known in the art: discrete electronic components, an integrated circuit, an application-specific integrated circuit having appropriately configured semiconductor devices and resistive elements, etc. Any of these hardware devices, whether acting or alone, with other devices, or other components such as a memory may also form or comprise components or means for performing various operations or steps of the disclosed methods.

When a system or method described herein is implemented, or partially implemented, in software, the software portion can be used to determine the optimal granularity or size for work partitions of parallelized work or tasks, for example in an auto-parallelized application being executed.

The software and data used in representing various elements can be stored in a memory and executed by a suitable instruction execution system (microprocessor). The software may comprise an ordered listing of executable instructions for implementing logical functions, and can be embodied in any "processor-readable medium" for use by or in connection with an instruction execution system, apparatus, or device, such as a single or multiple-core processor or processor-containing system. Such systems will generally access the instructions from the instruction execution system, apparatus, or device and execute the instructions.

FIG. 1 is a block diagram of an exemplary, non-limiting aspect of a PCD 100 that may implement the present systems and methods in the form of a wireless telephone capable of communicating with one or more wireless communication systems. Such wireless communication system may be a broadband wireless communication system, including a Long Term Evolution (LTE) system, a Code Division Multiple Access (CDMA) system, a Frequency Division Multiple Access (FDMA) system, a Global System for Mobile Communications (GSM) system, a wireless local area network (WLAN) system, some other wireless system, or a combination of any of these. A CDMA system may implement Wideband CDMA (WCDMA), CDMA 1×, Evolution-Data Optimized (EVDO), Time Division Synchronous CDMA (TD-SCDMA), or some other version of CDMA.

As shown, the PCD 100 includes an on-chip system 102 that includes a heterogeneous multi-core central processing unit ("CPU") 110 and an analog signal processor 126 that are coupled together. The CPU 110 may comprise a zeroth core 222, a first core 224, a second core 226, and an Nth core 228 as understood by one of ordinary skill in the art. Further, in addition to a CPU 110, a digital signal processor ("DSP") may also be employed as understood by one of ordinary skill in the art. Moreover, as is understood in the art of heterogeneous multi-core processors, each of the cores 222, 224, 226, 228 may process workloads at different efficiencies and/or speeds" under similar operating conditions. Similarly, the operating conditions of one or more of the cores 222, 224, 226, 228 may vary over time depending on a variety of factors.

Each of the cores 222, 224, 226, 228 may control one or more function of the PCD 100. For example, the first core 224 may be a graphics processing unit (GPU) for controlling graphics in the PCD 100. Such GPU/first core 224 may further include drivers and/or other components necessary to control the graphics in the PCD 100, including controlling communications between the GPU core 224 and memory 112 (including buffers). For another example, a different core such as the Nth core 228 may control the camera 148 and such core 228 may further include drivers and/or other components necessary to control the camera 148, including communications between the Nth core 228 and memory 112 (including buffers).

As illustrated in FIG. 1, a display controller 128 and a touch screen controller 130 are coupled to the multicore CPU 110. In turn, a display/touchscreen 132, external to the on-chip system 102, is coupled to the display controller 128 and the touch screen controller 130.

The PCD 100 of FIG. 1 may further include a video encoder 134, e.g., a phase alternating line (PAL) encoder, a sequential couleur a memoire (SECAM) encoder, or a national television system(s) committee (NTSC) encoder, or any other type of video decoder 134 coupled to the multicore CPU 110. Further, a video amplifier 136 is coupled to the video encoder 134 and the display/touchscreen 132. A video port 138 is coupled to the video amplifier 136.

As depicted in FIG. 1, a universal serial bus (USB) controller 140 is coupled to the multicore CPU 110. Also, a USB port 142 is coupled to the USB controller 140. A memory 112 and a subscriber identity module (SIM) card 146 may also be coupled to the multicore CPU 110. In other embodiments, multiple SIM cards 146 may be implemented.

In some embodiments, the camera 148 may be a digital camera 148 coupled to the multicore CPU 110. As discussed above, in such embodiments, the digital camera 148 may be controlled by one of the cores of the multicore CPU 110. In an exemplary aspect, the digital camera 148 is a charge-coupled device (CCD) camera or a complementary metal-oxide semiconductor (CMOS) camera.

As further illustrated in FIG. 1, a stereo audio CODEC 150 may be coupled to the multicore CPU 110. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation (FM) radio tuner 162 may be coupled to the stereo audio CODEC 150. Also, a FM antenna 164 is coupled to the FM radio tuner 162. Further, stereo headphones 166 may be coupled to the stereo audio CODEC 150.

FIG. 1 further indicates that a modem device/radio frequency ("RF") transceiver 168 may be coupled to the multicore CPU 110. The modem device 168 may support one or more of the wireless communications protocols, such as GSM, CDMA, W-CDMA, TDSCDMA, LTE, and variations of LTE such as, but not limited to, FDB/LTE and PDD/LTE wireless protocols. Additionally, there may be multiple modem devices 168, and in such embodiments, different modem devices 168 may support come or all of the wireless communication protocols and/or technologies listed above.

In some implementations the modem device 168 may be further comprised of various components, including a separate processor, memory, and/or RF transceiver. In other implementations the modem device 168 may simply be an RF transceiver. Further, the modem device 168 may be incorporated in an integrated circuit. That is, the components comprising the modem device 168 may be a full solution in a chip. Additionally, various components comprising the modem device 168 may also be coupled to the multicore CPU 110. An RF switch 170 may be coupled to the modem device 168 and an RF antenna 172. In various embodiments, there may be multiple RF antennas 172, and each such RF antenna 172 may be coupled to the modem device 168 through an RF switch 170.

As shown in FIG. 1, a keypad 174 may be coupled to the multicore CPU 110 either directly, or through the analog signal processor 126. Also, a mono headset with a microphone 176 may be coupled to the multicore CPU 110 and or analog signal processor 126. Further, a vibrator device 178 may also be coupled to the multicore CPU 110 and/or analog signal processor 126. FIG. 1 also shows that a power supply 188 may be coupled to the on-chip system 102, and in some implementations the power supply 188 is coupled via the USB controller 140. In a particular aspect, the power supply 188 is a direct current (DC) power supply that provides power to the various components of the PCD 100 that require power. Further, in a particular aspect, the power supply 188 may be a rechargeable DC battery or a DC power supply that is derived from an alternating current (AC) to DC transformer that is connected to an AC power source.

The multicore CPU 110 may also be coupled to one or more internal, on-chip thermal sensors 157A as well as one or more external, off-chip thermal sensors 157B. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157B may comprise one or more thermistors. The thermal sensors 157 may produce a voltage drop that is converted to digital signals with an analog-to-digital converter ("ADC") controller 103. However, other types of thermal sensors 157 may be employed without departing from the scope of the invention.

FIG. 1 further indicates that the PCD 110 may also include a network card 114 that may be used to access a data network, e.g., a local area network, a personal area network, or any other network. The network card 114 may be a Bluetooth network card, a WiFi network card, a personal area network (PAN) card, or any other network card well known in the art. Further, the network card 114 may be incorporated in an integrated circuit. That is, the network card 114 may be a full solution in a chip, and may not be a separate network card 114.

As depicted in FIG. 1, the display/touchscreen 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, and the power supply 180 are external to the on-chip system 102.

The on-chip system 102 may also include buses or interfaces and accompanying controllers (not shown). For example, a bus or interconnect communicatively couples the CPU 110 to components of a multimedia subsystem, including the video encoder 134. It should be understood that any number of buses and interconnects may be implemented in any configuration desired to allow the various components of the PCD 100 to communicate. Similarly, multiple bus or interconnect controllers may be arranged to monitor and manage the buses/interfaces of the on-chip system 102. Alternatively, a single bus/interface controller could be configured with inputs arranged to monitor two or more bus interfaces that communicate signals between CPU 110 and various subsystems of the PCD 100 as desired.

In a particular aspect, one or more of the method steps described herein may be enabled via a combination of data and processor instructions stored in the memory 112. These instructions may relate to applications, software, and/or code stored in the memory 112, or portions (such as threads) of such applications, software, and/or code. These instructions may be executed by one or more cores or processors in the multicore CPU 110 in order to perform the methods described herein. Further, the multicore CPU 100, one or more of the cores 222, 224, 226, 228, the memory 112, or a combination thereof may serve as a means for executing one or more of the method steps described herein in order enable adaptive thread control.

FIG. 2A is a graph illustrating an exemplary parallel execution of a workload, such as a parallelized portion of an application being executed by processors that may be implemented in the PCD embodiment illustrated in FIG. 1. For example, when complied, a portion of an application may have been auto-parallelized or otherwise designated to be executed by multiple threads/cores in parallel. In the exemplary graph of FIG. 2A the code has been auto-parallelized for execution by two threads 210A, 220A. However in other examples, the code may be auto-parallelized for execution by more than two threads.

As illustrated in FIG. 2A, two threads 210A and 220A of the application are being executed in parallel on core1 and core2, respectively, of a PCD in a fork-join framework or model. Thread1 210A includes one workload 212A being processed by core1. Similarly, thread2 220A includes one workload 222A being processed by core2. In the example illustrated in FIG. 2A, the workloads 212A and 222A have not been partitioned and are sized equally—i.e. each threads is being given the same amount of work to do/parallelized code to execute. However, because core1 is faster and/or currently operating at a higher frequency than core2, core1 executes its workload 212A in a shorter time period than core2 is able to execute its workload 222A.

The fork-join framework of each thread includes various delays or overhead as illustrated in FIG. 2A. For example, core1 has thread latency and synchronization overhead inherent in the fork and join operations represented by overhead periods 214A. Similarly, core2 also has thread latency and synchronization overhead inherent in the fork and join operations represented by overhead periods 224A. Again, because core 1 is faster and/or currently operating at a higher frequency than core2, the overhead periods 214A of core1 are shorter than the similar overhead periods 224A of core2.

Finally, core1 also has an idle period 216 that results from core1 accomplishing the synchronization 214A and processing the workload 212A faster than core2. Such differing operational speeds of core1 and core 2 may be due to static conditions, such as architecture differences between core1 and core 2 in a heterogeneous core/processor system or PCD. The differing operational speeds, and delays caused by such differing speeds, may also be caused and/or made greater by dynamic conditions such as pressure from competing applications or services that one or more of core1 and core2 is required to provide, impacts from thermal and other processor clock frequency throttling of core1 or core2, of impacts of processor/core sleep levels and power states such as for power savings reasons.

It has been determined that rather than automatically sending the auto-parallelized code to the number of required threads "N" for execution, breaking down the auto-parallelized code into work partitions can prevent the idle wait time 216 of FIG. 2A and increase the effective performance of the threads/cores by taking advantage of the faster processing time of the faster core. For example, as illustrated in FIG. 2B, if the auto-parallelized portion of the application is broken down into more, smaller work partitions (2.5×N in the embodiment of FIG. 2B) the idle wait time 216 of FIG. 2A is eliminated. As illustrated in FIG. 2B, the faster core1 can process three of the workload partitions 212B while the slower core2 processes two of the workload partitions 222B.

As also illustrated in FIG. 2B there are more overhead periods 214B, 224B associated with the increased number of workload partitions 212B, 222B. However, the overhead periods 214B, 224B are also correspondingly smaller, and more of the overhead periods 214B are incurred by core1 which is executing more of the workload partitions 212B. Thus, by breaking the parallelized code into more, smaller workload partitions 212B, 222B greater efficiencies by the threads/cores executing the parallelized code may be achieved.

Figure 3:
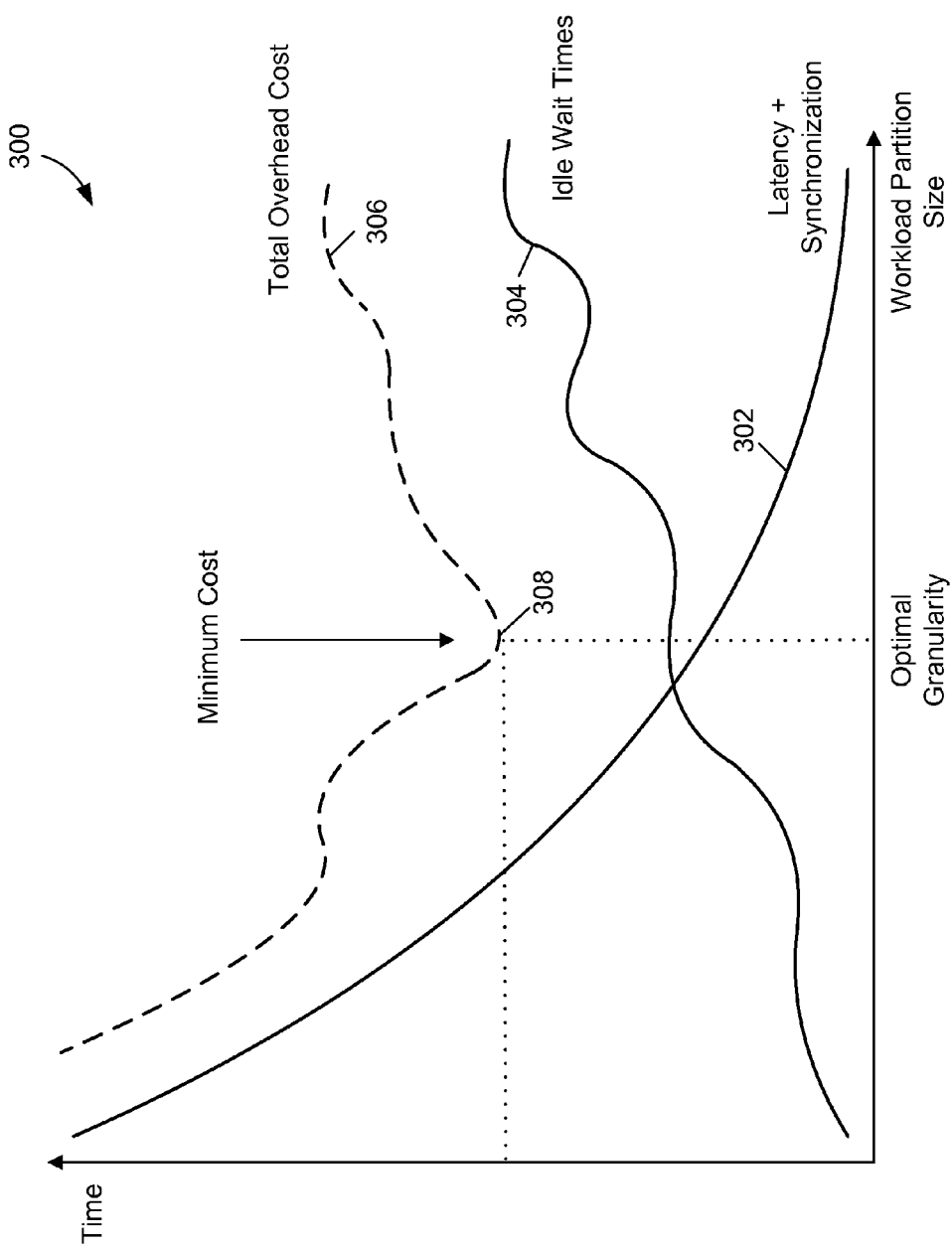
FIG. 3 is a graph illustrating an exemplary overhead costs for differing workload partition sizes over time.

However, as illustrated in FIG. 3, it has also been determined that breaking down the workload into many, small partitions, is not always desirable. FIG. 3 is a graph illustrating exemplary overhead costs for differing workload partition sizes/granularities over time. In FIG. 3, the horizontal axis represents workload partitions of increasing size or granularity/fewer number of partitions. The vertical axis represents time. As illustrated in FIG. 3, idle wait times shown in plot 304 generally decrease as the workload partitions decrease in size/increase in number, and generally increase as the workload partitions increase in size/decrease in number.

Conversely, the thread latency and synchronization overhead shown in plot 302 generally increases as the workload partitions decrease in size/increase in number, and generally decreases as the workload partitions increase in size/decrease in number. It has been determined that the total cost overhead cost of workload partitioning shown in plot 306 resolves to a minimum total cost 308 for a particular granularity/number of workload partitions (labeled optimal granularity) as illustrated in FIG. 3. However, this point of minimum cost 308 at a given time will vary based on static and dynamic factors, including the factors discussed above. Thus, it is desirable to dynamically adjust the granularity of the workload partitions in order to optimize performance of the parallel execution of threads.

Figure 4:
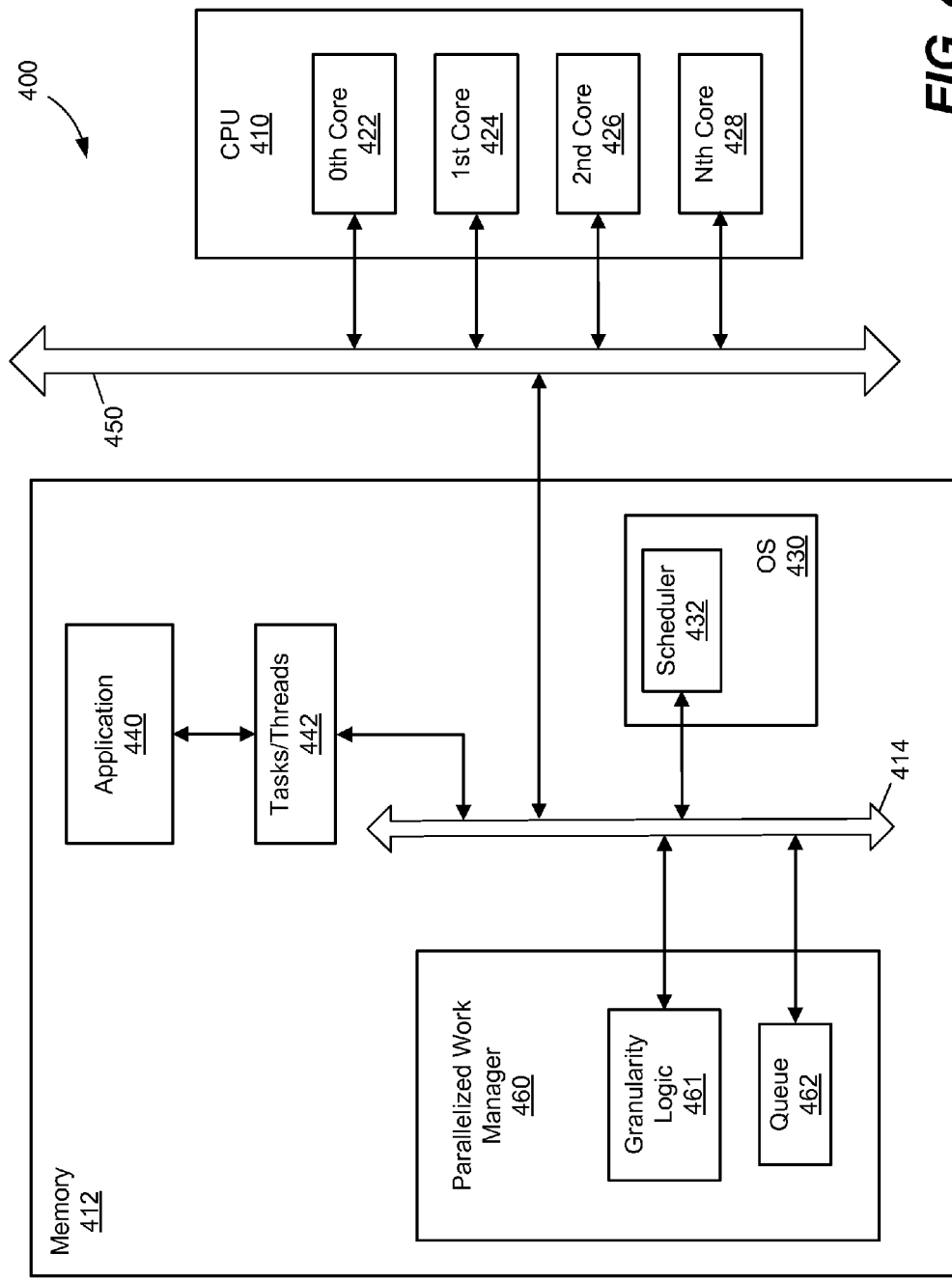
FIG. 4 is a block diagram showing an exemplary embodiment of a system for providing dynamic granularity control of parallelized workload in a PCD such as the embodiment of the PCD illustrated in FIG. 1.

FIG. 4 is a block diagram showing an exemplary embodiment of a system for providing dynamic granularity control of parallelized workload in a PCD. In the embodiment illustrated in FIG. 4, the system 400 includes a CPU 410 and a memory 412 in communication via interconnect 450. The system 400 may be a system-on-a-chip like SoC 102 of FIG. 1. Alternatively, one or more of the components illustrated for system 400 may be located on separate chips. CPU 410 shown in the exemplary embodiment of FIG. 4 is a heterogeneous multi-core/multi-processor CPU 410, such as the CPU 110 of FIG. 1.

The CPU 410 of FIG. 4 comprises four processors or cores, zeroth core 422, first core 424, second core 426, and Nth core 428, which may be similar to the cores 222, 224, 226, 228 in a PCD 100 discussed above for FIG. 1. Although four cores 422, 424, 426, 428 are illustrated in the embodiment of FIG. 4 more or fewer cores/processors may be implemented in other embodiments as desired. Each of the zeroth core 422, first core 424, second core 426, and Nth core 428 of FIG. 4 may be any type of processor or core including an application processor/core, a modem processor/core, a WiFi processor/core, a video decoder processor/core, an audio decoder processor/core, a GPU/graphics core, etc.

In the embodiment illustrated in FIG. 4, one or more of the cores 422, 424, 426, 428 are not symmetric and/or have differing sizes, processing frequencies, etc. Additionally, in an embodiment, one or more of the cores 422, 424, 426, 428 of FIG. 4 may include additional components not illustrated, such as a cache memory, a buffer memory, dynamic clock voltage scaling (DCVS) logic, etc. Each of cores 422, 424, 426, 428 and/or CPU 410 is communicatively coupled to interconnect 450. Interconnect 450 may be any desired interconnect, such as a bus, crossbars, etc., that allows processing instructions, data, signals, etc., to be communicated to and from the cores 422, 424, 426, 428 and/or the CPU 410.

Interconnect 450 is also coupled with memory 412 to allow communications between memory 412 and CPU 410. The memory 412 is illustrated in FIG. 4 as a single memory for simplicity. However, one of ordinary skill would understand that memory 412 may comprise multiple different memories, including partitions of a single physical memory and/or physically separated memories in communication such as through interconnect 450. Accordingly, one or more the "components" illustrated as part of/being stored in the memory 412 in FIG. 4 may be stored in a memory remotely located from the memory 412 in FIG. 4.

The illustrated memory 412 contains an operating system 430 for the CPU 410, which may be a high-level operating system (HLOS). The operating system 430 includes a scheduler 432 that operates to schedule delivery of instructions, code, data, tasks, threads, etc. to one or more of the cores 422, 424, 426, 428 of the CPU 410 for execution. The operating system 430 and/or scheduler 432 are in communication with memory interconnect 414 which allows communications between the various components of the memory 412 (or between the various memories in some embodiments). In some embodiments the memory interconnect 414 may be the same bus or interconnect as interconnect 450, or may in other embodiments be a different bus or interconnect than interconnect 450.

Also stored in the memory 412 are one or more applications 440 in communication with the operating system 430 and the multicore CPU 410. The applications are illustrated as single application 440 in FIG. 4. However, in other embodiments, more applications may be stored in memory 414 and/or executed by multicore CPU 410 in the manner discussed below. The application 440 may comprise software, code, and/or instructions to be executed by the CPU 410 in order to perform some function on or for the system 400 and/or or for a PCD 100. For example, application 440 may comprise code for rendering graphics on a display of the PCD 100, while another exemplary application 440' (not illustrated) may comprise code or instructions to allow a user to enter data through a touchscreen of the PCD 100. Furthermore, it will be understood that the application 440 may also be background tasks such as a location tracker, a daemon or other executable software function with a process ID.

In an aspect, the application 440 may each send one or more tasks/threads 442 to the operating system 430 to be processed at one or more of the cores 422, 424, 426, 428 within the multicore CPU 410. The tasks/threads 442 of the application 440 may be processed or executed serially as single tasks/threads serially, in parallel as parallelized tasks/ threads, or a combination thereof. For example an application 440 may have been compiled for execution in a manner such that a portion of the application 440 comprising a first set of tasks/threads 442 will be processed by a single thread, while another portion of the application 440 comprising a second set of tasks/threads 442 will be processed at the same time in parallel by multiple threads. The scheduler 432 may schedule these tasks, threads, or a combination thereof for execution by the multicore CPU 410 as instructed by the operating system 430, including for execution or processing in parallel.

Memory 412 also contains a Parallelized Work Manager 460 comprising granularity logic 461 and one or more queues 462 in communication with the operating system 430 and the application 440. In the embodiment of FIG. 4, a single queue 462 is illustrated. More than the one queue 462 may be implemented in other embodiments. The queue 462 may correspond to the application 440 in an embodiment, and may function to hold tasks 442 of the application 440 that have been parallelized for processing/execution by more than one thread in parallel.

The granularity logic 461, either by itself or in conjunction with other components of the Parallelized Work Manager 460, operates to dynamically and/or adaptively determining the optimal granularity of workload partitions for any parallelized portions of application 440. As would be understood, the Parallelized Work Manager 460 may be one component as illustrated in FIG. 4. In other embodiments, the Parallelized Work Manager 460 may comprise separate components either co-located or located remotely from each other. In yet other embodiments, the Parallelized Work Manager 460 may not be a separate component at all, but the functions of the Parallelized Work manager 460 may be performed by other components or parts of the system 400, such as a run-time library, the OS 430, and/or the scheduler 432. Additionally, in some embodiments one or more components of the Parallelized Work Manager 460 of FIG. 4, such as the granularity logic 461 may comprise multiple components or sub-components.

In an embodiment, the parallelized tasks/threads 442 of the application 440 may have been created when the application 440 was compiled. For example, the parallelized tasks/threads 442 and may have been auto-parallelized by the complier or otherwise identified, designated, and/or flagged for parallel processing when the application 440 is executed.

The granularity logic 461 may be adapted to operate, or a separate logic 461' of the Parallelized Work Manager 460 may be adapted to operate, during runtime of application 440. For example, in an embodiment, the granularity logic 461 may during runtime operate to dynamically and/or adaptively determine the optimal granularity for workload partitions—e.g. workload partition sizes that result in a minimum total overhead cost—for the parallelized tasks/threads 442 of the application 440. The granularity logic 461 may make this determination based on the present state or condition of the system among other factors.

Once the optimal granularity for the workload partitions have been determined for the parallelized tasks/threads 442 of the application 440, the tasks/threads 442 may be broken into the partitions and distributed to the appropriate cores 422, 424, 426, 428 needed to execute the number of parallelized tasks/threads 442. For example, in an embodiment, the workload partitions may be placed into the queue 462. The scheduler 432 may then operate to push the workload partitions from the queue 462 to the cores 422, 424, 426, 428 designated to execute the tasks/threads 442. Alternatively, the schedule 432 may operate to allow the workload partitions to be pulled from the queue 462 by the designated cores 422, 424, 426, 428, for processing in parallel.

Figure 5A:
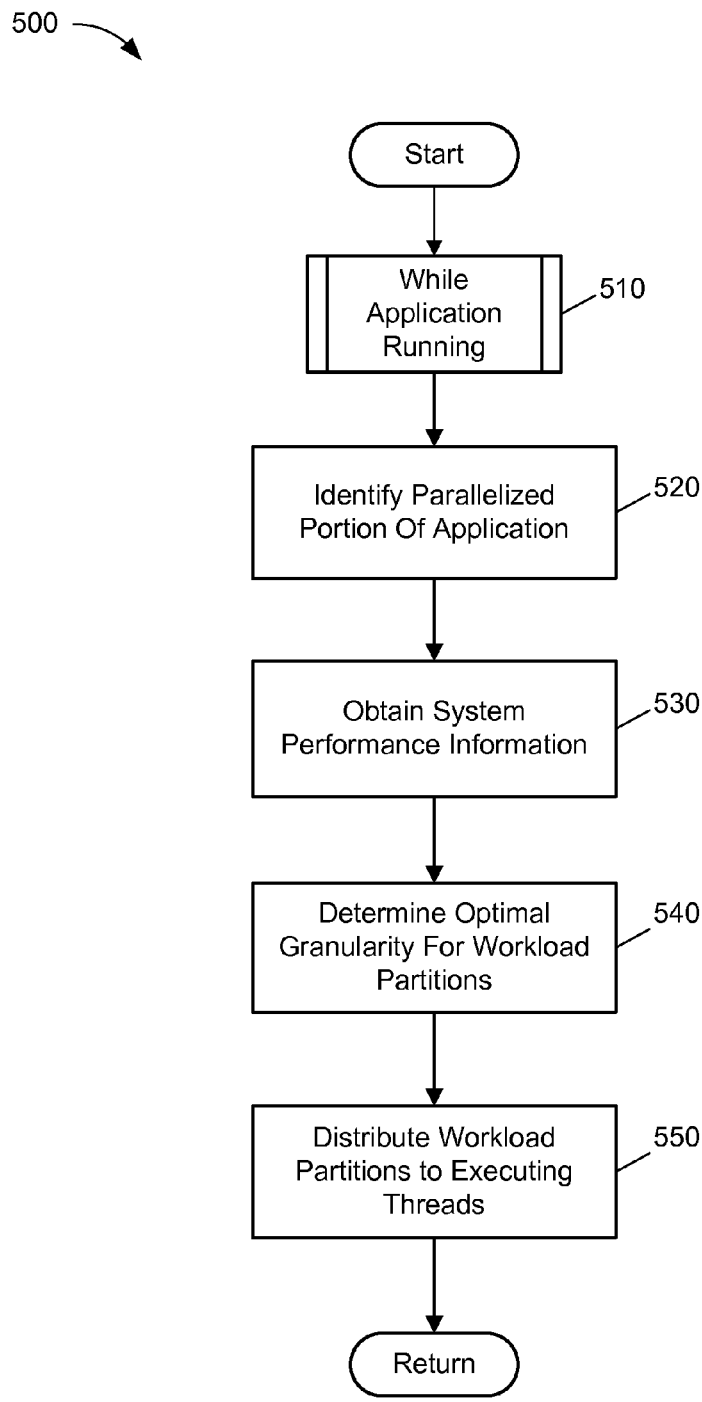
FIG. 5A is a flowchart describing an exemplary embodiment of a method for providing dynamic granularity control of parallelized work in a PCD.

Referring now to FIG. 5A, a flowchart describing an exemplary embodiment of a method 500 for providing dynamic granularity control of parallelized work in a PCD. The method 500 may be executed by a system such as system 400 shown in FIG. 4. In an embodiment, the method 500 may be performed by one or more components of the system 400, such as the granularity logic 461, either operating by itself or in conjunction with other components of the system 400.

In block 510 one or more application is being run or executed on the PCD, which may be PCD 100 illustrated in FIG. 1. The application running in block 510 may be an application similar to application 440 discussed above for FIG. 4. The application being run in block 510 will include one or more parallel or parallelized portions. These parallelized portions are intended to be executed or processed in parallel at runtime by separate threads/cores, such as cores 422, 424, 426, 428 illustrated in FIG. 4.

While the application is running in block 510, the method 500 will identify in block 520 a parallelized portion of the application that is to be executed. Such parallel or parallelized portions of the application may be code, instructions, or tasks that were previously auto-parallelized when the application was compiled, or that were otherwise designated or identified to be executed in parallel at runtime. For example, the parallelized portions of the application may be parallel tasks/threads 442 discussed above for FIG. 4 The identification or recognition that the parallelized portion of the application to be executed as a may be accomplished in any desired manner, such as for example by recognizing or identifying a fork operation in a fork-join model.

Once block 520 identifies, recognizes or otherwise determines that the portion of the application to be executed is a parallelized portion, system performance information is obtained in block 530. In differing embodiments a variety of system performance information may be obtained in block 530. For example static performance information based on the architecture of the system (such as system 400 for example), the specific heterogeneous processors/cores implemented in the architecture (such as cores 422, 424, 426, 428 for example), etc.

Dynamic performance information may also, or instead, be obtained in block 530 in some embodiments. This dynamic performance information may include identification of which cores/processors are available to execute the parallelized tasks. For example if the parallelized portion requires "N" number of threads/cores to execute in parallel, the dynamic performance information may include identifying which cores/processors are available to, or will, execute the threads.

Dynamic performance information obtained in block 530 in some embodiments may also include the present performance level of one or more of the available core/processors. The present performance level of the cores/processors may be impacted by one or more of: the present clock frequency; demands or pressure from competing applications or services; thermal and other processor throttling mechanisms that may be operating on the PCD; present processor sleep levels and power states; etc. These various factors may impact some, or all of the available cores/processors, and may impact each core/processer in differing manners or to differing degrees.

The system performance information may be obtained in block 530 in varying ways. For example, in some embodiments, the system performance information may be obtained by a query to a system file containing the present status of the system. In other embodiments, the system performance information may instead be measured, such as by applying time tags to the parallelized portions of the application and monitoring the time required for each executing core/processor to receive and complete each parallelized portion, including fork operations, signaling, join operations, etc.

In yet other embodiments, the system performance information obtained in block 530 may be obtained by different methods at different times. For example, in an implementation, the first time that a parallelized portion of the application is identified in block 520, the information in block 530 may be obtained by a query to a system file and time tags may be applied to the parallelized portions. Continuing the example, for a subsequent identification of a second parallelized portion of the application in block 520, the information in block 530 may be obtained by using the time tag information from the execution of the previous parallelized portion.

In still other embodiments the method 500 may adaptively determine which manner to use in block 530 to obtain the system performance information and/or whether or not to always obtain the information in block 530. For example, in such embodiments where an application has few parallelized portions—i.e. where block 520 will identify that few instances of parallelized portions exist in the application—it may be determined either ahead of time or during the operation of the method 500 to obtain the system performance information by query every time block 520 identifies a parallelized portion of the application.

In some embodiments if may be determined to not incur the time cost associated with the query for one or more instance of block 520 identifying the parallelized portions. For example, where an application has several parallelized portions (such a number of instances of parallelization above a threshold number), it may be determined either ahead of time, at block 520, at block 530, or at another block not illustrated to not obtain the information with a query. Instead, for one or more instances of a parallelized portion being identified by block 520, the system performance information may be obtained from monitored time tags as described above. Additionally, in some embodiments, for one or more instances of the parallelized portions of the application it may be determined to not obtain the system performance information at all. For example, the method 500 may determine at block 520, block 530 (or another block not illustrated) to not obtain the system performance information for an instance of a parallelized portion unless a threshold time period has passed since the system performance information was last obtained.

Continuing in the method 500 to block 540, the optimal granularity for the workload partitions is determined based at least in part on the system performance information obtained in block 530. In some embodiments, the determination in block 540 may also be based in part on other factors or information in addition to the system performance information obtained in block 530. For example, the determination in block 540 may also take into account information derived when the application was compiled. Such information from when the application was compiled may include tables of information built or created when the application was compiled. These tables may contain information about the target system for which the application was compiled and/or information about expected overhead from operating tasks in parallel such as times for fork or join operations.

In an embodiment, the determination of block 540 may comprise determining a size and number of the workload partitions that results in each thread completing its parallel execution at approximately the same time. In other embodiments, the determination of block 540 may comprise determining a granularity of the workload partitions that results in the least amount of total overhead cost for all of the threads/cores required to execute the parallelized portion of the application. An exemplary embodiment for the determination of block 540 is described below, although other manners of making the determination may be implemented instead of, or in addition to, the exemplary embodiment.

In the exemplary embodiment, the parallelized portion of the application requires "N" threads, which may comprise "N" cores, such as cores 422, 424, 426, 428 of FIG. 4, operating in parallel in order to execute the parallelized portion. In this embodiment, the determination at block 540 comprises determining a potential number "M" of valid granularities for the workload partitions of the "N" threads. This number "M" of valid granularities may be determined in any manner desired, such as from a table or by an algorithm.

In this exemplary embodiment, for each of the "M" number of possible granularities of the workload partitions, the processing work "K" that will be performed by each of the "N" parallel threads executing the workload partitions is determined or estimated. This "K" value for each of the "N" parallel threads may be based on some, or all, of the static and/or dynamic performance information about the system described above that may be obtained in block 530.

In some implementations of the exemplary embodiment, for each of the "M" number of possible granularities of the workload partitions, an expected overhead cost "O" that will be incurred by each of the "N" parallel threads executing the workload partitions may also be determined or estimated. Such overhead costs "O" for each of the "N" threads may include latencies involved in the dispatching the parallelized work to the thread; overhead for thread synchronization when obtaining the work from a queue; overhead for the thread signaling that work processing has completed; and/or costs, if any, of the thread remaining in idle waits as slower threads complete. The overheads costs "O" may be different for each thread. Similarly, one or more of the above costs may not apply to a particular one of the "N" threads.

In the exemplary embodiment, for each of the "M" possible granularities of workload partitions, a total cost of processing the parallelized portion with the "N" threads may be determined. In an implementation, this "Total Cost(M)" may the determined by multiplying the processing work K(M) by the overhead O(M) for each of the "N" threads required to execute the parallelized portion, and summing these values for each "N" of the threads. An exemplary formula for this determination is:

$$\text{Total Cost}(M) = \sum_{i=1}^{N} (K_i(M) \times O_i(M))$$

In the exemplary embodiment, the workload partition size/granularity among the "M" granularities that results in the lowest "Total Cost(M)" is determined in block 540 as the optimal granularity for the workload partitions of the parallelized portion of the application.

The parallelized portions of the application are broken into the workload partitions at the optimal granularity and are distributed to the "N" executing threads in block 550. Distributing the workload partitions in block 550 may comprise placing the threads into a queue, such as queue 462 of FIG. 4 from which the executing threads/cores (such as cores 422, 424, 426, 428) may pull the workload partitions or any other desired method of distributing the workload partitions to the executing threads/cores.

FIG. 5A describes only one exemplary embodiment of a method for providing for providing dynamic granularity control of parallelized work in a PCD. In other embodiments, additional blocks or steps may be added to method 500. Similarly, in some embodiments various blocks or steps shown in FIG. 5A may be combined or omitted, such as for example combining blocks 520 and 530 into one identifying/obtaining block/step rather than the two separate blocks/steps illustrated in FIG. 5A. Such variations of the method 500 are within the scope of this disclosure.

Additionally, certain steps in the processes or process flows described in this specification naturally precede others for the invention to function as described. However, the disclosure is not limited to the order of the steps described if such order or sequence does not alter the functionality. Moreover, it is recognized that some steps may performed before, after, or in parallel (substantially simultaneously) with other steps without departing from the scope of this disclosure. In some instances, certain steps may be omitted or not performed without departing from the scope of the disclosure. Further, words such as "thereafter", "then", "next", "subsequently", etc. are not intended to limit the order of the steps. These words are simply used to guide the reader through the description of the exemplary method 500.

Figure 5B:
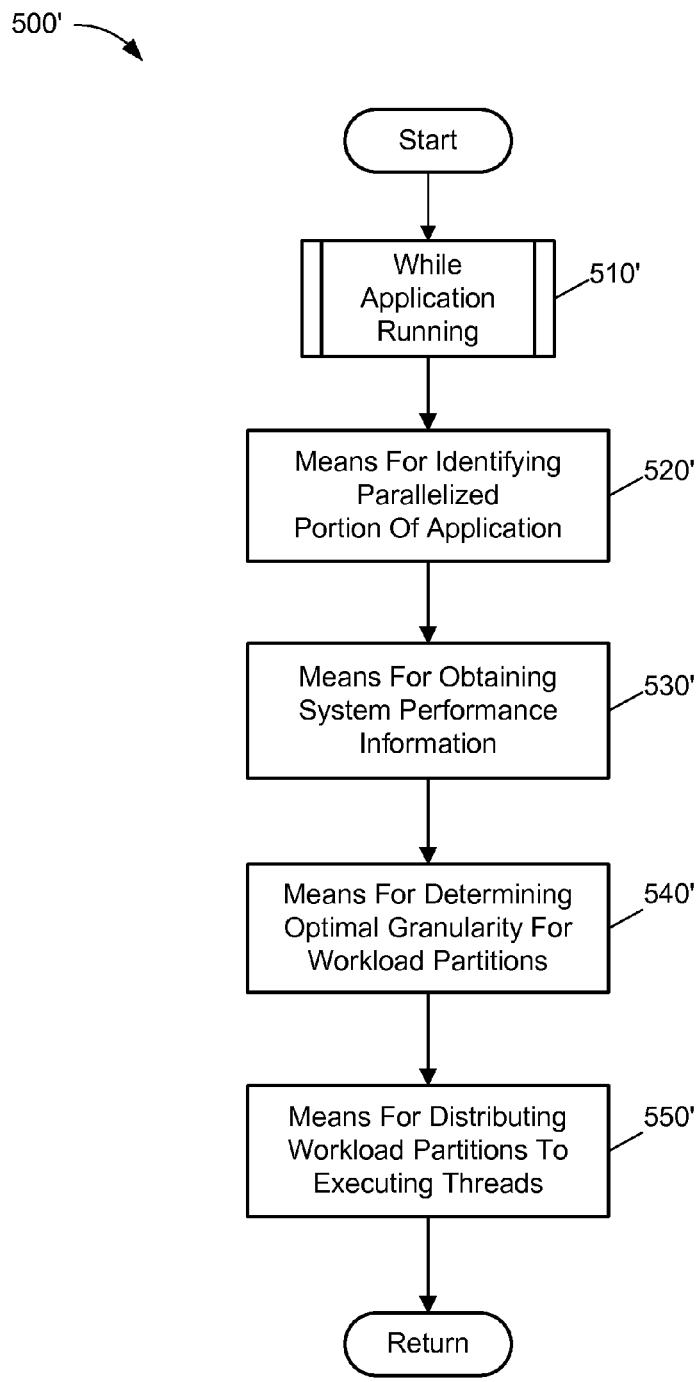
FIG. 5B illustrates example components capable of performing the method illustrated in FIG. 5A.

The various operations and/or methods described above may be performed by various hardware and/or software component(s) and/or module(s), and such component(s) and/or module(s) may provide the means to perform such operations and/or methods. Generally, where there are methods illustrated in Figures having corresponding counterpart means-plus-function Figures, the operation blocks correspond to means-plus-function blocks with similar numbering. For example, blocks 510-550 illustrated in FIG. 5A correspond to means-plus-function blocks 510'-550' illustrated in FIG. 5B.

Additionally, one of ordinary skill in programming is able to write computer code or identify appropriate hardware and/or circuits to implement the disclosed method or system without difficulty based on the flow charts and associated description in this specification, for example. Therefore, disclosure of a particular set of program code instructions or detailed hardware devices is not considered necessary for an adequate understanding of how to make and use the disclosed system or method. The inventive functionality of the claimed processor-enabled processes is explained in more detail in the above description and in conjunction with the drawings, which may illustrate various process flows.

In one or more exemplary aspects as indicated above, the functions described may be implemented in hardware, software, firmware, or any combination thereof. If implemented in software, the functions may be stored on or transmitted as one or more instructions or code on a computer-readable medium, such as a non-transitory processor-readable medium. Computer-readable media include both data storage media and communication media including any medium that facilitates transfer of a program from one location to another.

A storage media may be any available media that may be accessed by a computer or a processor. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and Blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made herein without departing from the scope of the present disclosure, as defined by the following claims.

What is claimed is:

1. A method for a method for providing dynamic granularity control of parallelized work in a heterogeneous multi-processor portable computing device (PCD), the method comprising:
    identifying a first parallelized portion of an application executing on the heterogeneous multi-processor PCD, the first parallelized portion comprising a plurality of threads for parallel execution on the PCD;
    obtaining performance information about a plurality of processors of the PCD, each of the plurality of processors corresponding to one of the plurality of threads;
    determining a number M of workload partition granularities for the plurality of threads, where M is a positive integer;
    determining a total execution cost for each of the M workload partition granularities, wherein the determination of the total execution cost comprises:
        determining an amount of processing work that will be performed by each of the plurality of processors,
        determining an amount of overhead cost that will be incurred by each of the plurality of processors,
        multiplying the amount of processing work performed by each of the plurality of processors by the amount of overhead incurred by the corresponding one of the plurality of processors, and
        summing the multiplied values for the plurality of processors;
    determining a desired granularity comprising a one of the M workload partition granularities with a lowest total execution cost; and
    partitioning the first parallelized portion of the application into a plurality of workloads having the desired granularity.

2. The method of claim 1, wherein obtaining performance information about the plurality of processors of the PCD comprises:
    obtaining a present performance level of the plurality of processors of the PCD.

3. The method of claim 2, wherein obtaining the present performance level of the plurality of processors of the PCD comprises querying a system information file.

4. The method of claim 2, wherein obtaining the present performance level of the plurality of processors of the PCD further comprises determining one or more of:
    a present clock frequency of each of the plurality of processors, a demand from a competing application for one or more of the plurality of processors, a thermal throttling applied to one or more of the plurality of processors, a power throttling applied to one or more of the plurality of processors, or a sleep mode applied to one or more of the plurality of processors.

5. The method of claim 1, wherein determining the amount of overhead cost that will be incurred by each of the plurality of processors further comprises determining for each of the plurality of processors one or more of:
a latency involved in dispatching work to the processor, a delay from synchronization when obtaining work from a queue, a delay from signaling that processing has completed, and an idle wait.

6. The method of claim 1, wherein the determination of the total execution cost for each of the M workload partition granularities is based in part on information about the first parallelized portion of the application derived when the application was compiled.

7. The method of claim 1, further comprising:
distributing the plurality of workloads having the desired granularity to the plurality of processors.

8. A system for providing dynamic granularity control of parallelized work in a heterogeneous multi-processor portable computing device (PCD):
a central processing unit (CPU) containing a plurality of heterogeneous processors; and
a memory in communication with the CPU, the memory storing:
at least one application being executed by the CPU, logic configured to:
identify a first parallelized portion of the application, the first parallelized portion comprising a plurality of threads for parallel processing by the CPU,
obtain performance information about a first set of the plurality of processors of the PCD, each of first set of the plurality of processors corresponding to one of the plurality of threads,
determine a number M of workload partition granularities for the plurality of threads where M is a positive integer,
determine a total execution cost for each of the M workload partition granularities by:
determining an amount of processing work that will be performed by each of the first set of the plurality of processors,
determining an amount of overhead cost that will be incurred by each of the first set of the plurality of processors,
multiplying the amount of processing work performed by each of the first set of the plurality of processors by the amount of overhead incurred by the corresponding one of the first set of the plurality of processors, and
summing the multiplied values for the first set of the plurality of processors;
determine a desired granularity comprising a one of the M workload partition granularities with a lowest total execution cost, and
partition the first parallelized portion of the application into a plurality of workloads having the desired granularity.

9. The system of claim 8, wherein the obtaining performance information about the first set of the plurality of processors of the PCD comprises:
obtaining a present performance level of first set of the plurality of processors of the PCD.

10. The system of claim 9, wherein the obtaining a present performance level of first set of the plurality of processors of the PCD comprises querying a system information file.

11. The system of claim 9, wherein obtaining the present performance level of the plurality of processors of the PCD further comprises determining one or more of:
a present clock frequency of each of the first set of the plurality of processors, a demand from a competing application for one or more of the first set of the plurality of processors, a thermal throttling applied to one or more of the first set of the plurality of processors, a power throttling applied to one or more of the first set of the plurality of processors, or a sleep mode applied to one or more of the first set of the plurality of processors.

12. The system of claim 8, wherein the determination of the amount of overhead cost that will be incurred by each of the plurality of processors further comprises determining for each of the first set of the plurality of processors one or more of:
a latencies involved in dispatching work to the processor, a delay from synchronization when obtaining work from a queue, a delay from signaling that processing has completed, and an idle wait.

13. The system of claim 8, where the determination of the total execution cost for each of the M workload partition granularities is based in part on information about the first parallelized portion of the application derived when the application was compiled.

14. The system of claim 8, wherein the logic is further configured to:
distribute the plurality of workloads having the optimal desired granularity to the first set of the plurality of processors.

15. A computer program product comprising a non-transitory computer usable medium having a computer readable program code embodied therein, said computer readable program code adapted to be executed to implement a method for dynamic granularity control of parallelized work in a heterogeneous multi-processor portable computing device (PCD), the method comprising:
identifying a first parallelized portion of an application executing on the heterogeneous multi-processor PCD, the first parallelized portion comprising a plurality of threads for parallel execution on the PCD;
obtaining performance information about a plurality of processors of the PCD, each of the plurality of processors corresponding to one of the plurality of threads;
determining a number M of workload partition granularities for the plurality of threads, where M is a positive integer;
determining a total execution cost for each of the M workload partition granularities, wherein determining the total execution cost comprises:
determining an amount of processing work that will be performed by each of the plurality of processors,
determining an amount of overhead cost that will be incurred by each of the plurality of processors,
multiplying the amount of processing work performed by each of the plurality of processors by the amount of overhead incurred by the corresponding one of the plurality of processors, and
summing the multiplied values for the plurality of processors;
determining a desired granularity comprising a one of the M workload partition granularities with a lowest total execution cost; and
partitioning the first parallelized portion of the application into a plurality of workloads having the desired granularity.

16. The computer program product of claim 15, wherein obtaining performance information about the plurality of processors of the PCD comprises:
obtaining a present performance level of the plurality of processors of the PCD.

17. The computer program product of claim 16, wherein obtaining the present performance level of the plurality of processors of the PCD comprises querying a system information file.

18. The computer program product of claim 16, wherein obtaining the present performance level of the plurality of processors of the PCD further comprises determining one or more of:
a present clock frequency of each of the plurality of processors, a demand from a competing application for one or more of the plurality of processors, a thermal throttling applied to one or more of the plurality of processors, a power throttling applied to one or more of the plurality of processors, or a sleep mode applied to one or more of the plurality of processors.

19. The computer program product of claim 15, wherein determining the amount of overhead cost that will be incurred by each of the plurality of processors further comprises determining for each of the plurality of processors one or more of:
a latency involved in dispatching work to the processor; a delay from synchronization when obtaining work from a queue; a delay from signaling that processing has completed; and an idle wait.

20. The computer program product of claim 15, where the determination of the total execution cost for each of the M workload partition granularities is based in part on information about the first parallelized portion of the application derived when the application was compiled.

21. A system for dynamic granularity control of parallelized work in a heterogeneous multi-processor portable computing device (PCD), the system comprising:
means for identifying a first parallelized portion of an application executing on the heterogeneous multi-processor PCD, the first parallelized portion comprising a plurality of threads for parallel execution on the PCD;
means for obtaining performance information about a plurality of processors of the PCD, each of the plurality of processors corresponding to one of the plurality of threads;
means for determining a number M of workload partition granularities for the plurality of threads, where M is a positive integer;
means for determining a total execution cost for each of the M workload partition granularities comprising:
means for determining an amount of processing work that will be performed by each of the plurality of processors,
means for determining an amount of overhead cost that will be incurred by each of the plurality of processors,
means for multiplying the amount of processing work performed by each of the plurality of processors by the amount of overhead incurred by the corresponding one of the plurality of processors, and
means for summing the multiplied values for the plurality of processors;
means for determining a desired granularity comprising a one of the M workload partition granularities with a lowest total execution cost; and
means for partitioning the first parallelized portion of the application into a plurality of workloads having the desired granularity.

22. The system of claim 21, wherein the means for obtaining performance information about the plurality of processors of the PCD comprises:
means for obtaining a present performance level of the plurality of processors of the PCD.

23. The system of claim 22, wherein the means for obtaining the present performance level of the plurality of processors of the PCD comprises:
means for querying a system information file.

24. The system of claim 22, wherein the means for obtaining the present performance level of the plurality of processors of the PCD further comprises:
means for determining one or more of a present clock frequency of each of the plurality of processors, a demand from a competing application for one or more of the plurality of processors, a thermal throttling applied to one or more of the plurality of processors, a power throttling applied to one or more of the plurality of processors, or a sleep mode applied to one or more of the plurality of processors.

25. The system of claim 21, wherein the means for determining the amount of overhead cost that will be incurred by each of the plurality of processors further comprises:
means for determining for each of the plurality of processors one or more of a latency involved in dispatching work to the processor; a delay from synchronization when obtaining work from a queue; a delay from signaling that processing has completed; and an idle wait.

26. The system of claim 21, the determination of the total execution cost for each of the M workload partition granularities is based in part on information about the first parallelized portion of the application derived when the application was compiled.

* * * * *